US012572568B2

(12) United States Patent
Kulkarni et al.

(10) Patent No.: US 12,572,568 B2
(45) Date of Patent: Mar. 10, 2026

(54) MANAGING A DATA PLATFORM

(71) Applicant: Schlumberger Technology Corporation, Sugar Land, TX (US)

(72) Inventors: Mandar Janardan Kulkarni, Clamart (FR); Sunil Manikani, Pune (IN); Fabrice Haüy, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/824,019

(22) Filed: Sep. 4, 2024

(65) Prior Publication Data

US 2025/0077548 A1 Mar. 6, 2025

(30) Foreign Application Priority Data

Sep. 4, 2023 (IN) .............................. 202311059406

(51) Int. Cl.
*G06F 16/30* (2019.01)
*G06F 16/22* (2019.01)
*G06F 16/25* (2019.01)
*G06F 16/28* (2019.01)

(52) U.S. Cl.
CPC ........ *G06F 16/285* (2019.01); *G06F 16/2264* (2019.01); *G06F 16/258* (2019.01)

(58) Field of Classification Search
CPC ... G06F 16/285; G06F 16/258; G06F 16/2264
See application file for complete search history.

(56) References Cited

U.S. PATENT DOCUMENTS

| | | | |
|---|---|---|---|
| 2004/0193570 A1 * | 9/2004 | Yaeger | G06F 16/24556 |
| 2023/0105422 A1 | 4/2023 | Pickles et al. | |
| 2024/0061867 A1 * | 2/2024 | Wolfe | G06N 20/20 |
| 2024/0144040 A1 * | 5/2024 | Kim | G06N 5/022 |
| 2024/0419690 A1 * | 12/2024 | Sharma | G06F 16/285 |

OTHER PUBLICATIONS

Extended Search Report issued in European Patent Application No. 24198487.1 dated Jan. 9, 2025, 7 pages.

* cited by examiner

*Primary Examiner* — Khanh B Pham
(74) *Attorney, Agent, or Firm* — Jeffrey D. Frantz

(57) ABSTRACT

A method for managing a data platform includes converting a plurality of data records in the data platform into embeddings. The method also includes applying a clustering algorithm to the embeddings to identify a first subset of the embeddings corresponding to a first subset of the data records and a second subset of the embeddings corresponding to a second subset of data records. The method also includes determining that the first subset of embeddings have a similarity with respect to one another that is within a first similarity threshold. The method also includes deleting one or more of the first subset of data records from the data platform in response to the similarity of the first subset of embeddings being within the first similarity threshold.

15 Claims, 8 Drawing Sheets

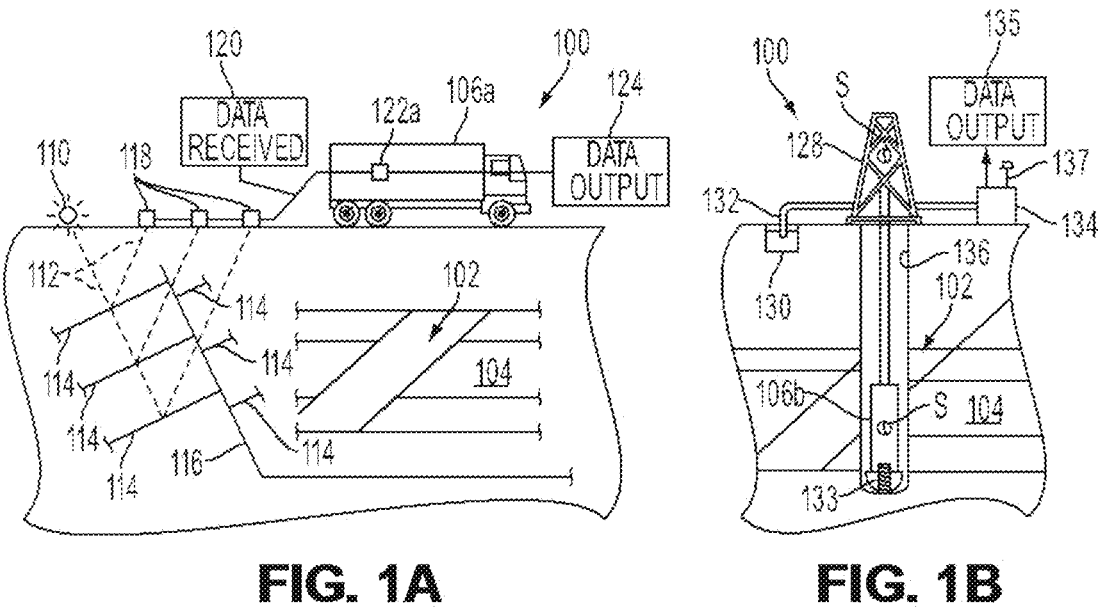
FIG. 1A          FIG. 1B
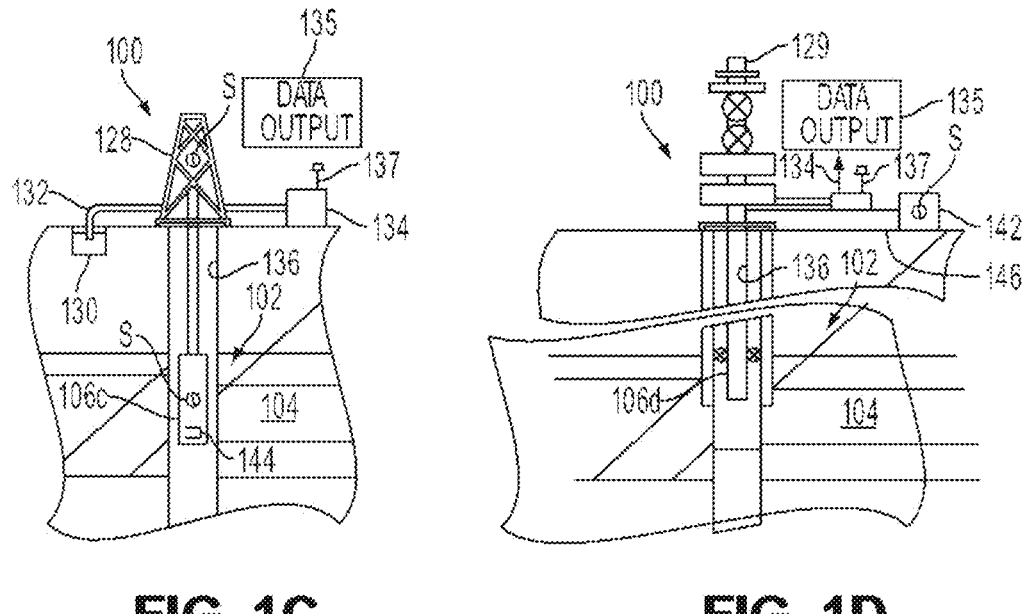
FIG. 1C          FIG. 1D

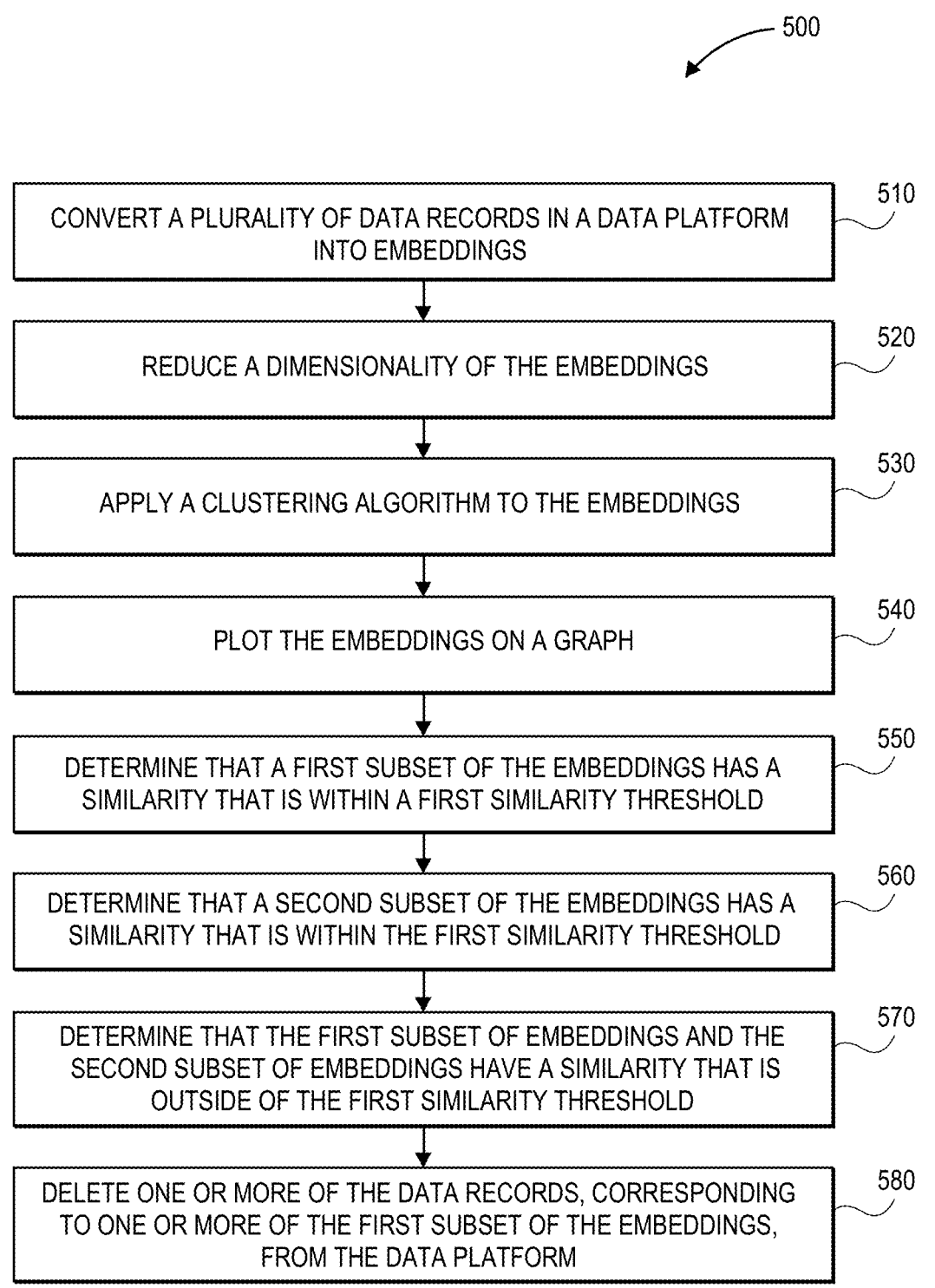

500

510   CONVERT A PLURALITY OF DATA RECORDS IN A DATA PLATFORM INTO EMBEDDINGS

520   REDUCE A DIMENSIONALITY OF THE EMBEDDINGS

530   APPLY A CLUSTERING ALGORITHM TO THE EMBEDDINGS

540   PLOT THE EMBEDDINGS ON A GRAPH

550   DETERMINE THAT A FIRST SUBSET OF THE EMBEDDINGS HAS A SIMILARITY THAT IS WITHIN A FIRST SIMILARITY THRESHOLD

560   DETERMINE THAT A SECOND SUBSET OF THE EMBEDDINGS HAS A SIMILARITY THAT IS WITHIN THE FIRST SIMILARITY THRESHOLD

570   DETERMINE THAT THE FIRST SUBSET OF EMBEDDINGS AND THE SECOND SUBSET OF EMBEDDINGS HAVE A SIMILARITY THAT IS OUTSIDE OF THE FIRST SIMILARITY THRESHOLD

580   DELETE ONE OR MORE OF THE DATA RECORDS, CORRESPONDING TO ONE OR MORE OF THE FIRST SUBSET OF THE EMBEDDINGS, FROM THE DATA PLATFORM

FIG. 5

MANAGING A DATA PLATFORM

CROSS-REFERENCE TO RELATED APPLICATIONS

This application claims priority to Indian Provisional Patent Application No. 202311059406, filed on Sep. 4, 2023, which is incorporated by reference.

BACKGROUND

Large amounts of data may be received and stored in a data platform such as Open Subsurface Data Universe (OSDU). During the time period in which the data is received and stored, redundant data in the platform increases, which makes the platform more complex to manage and maintain in terms of security and backup. The problem of redundant data in the data platform is two-fold. For example, for a well having a unique well identifier "123456," there can be multiple records providing details about the well with this well identifier (i.e., duplicate records), and there can be multiple versions of each record (i.e., duplicate versions). The records stored in the data platform can also contain relationships with other records, and if the data is not deleted with due diligence, then these can become 'orphan' records in the data platform.

Services running on the platform are slowed as they try to process larger and larger amounts of data. For example, a search service running on the data platform may have to scan through duplicate records, duplicate versions, and/or orphan records, and that will slow the search performance. Similarly, in the case of a response from the search service, the data that is to be returned from the service may be large because the service will provide the found records, and the user will have to filter the duplicate records, duplicate versions, and/or orphan records from the response received.

There is currently no technique available that relies on a machine-learning (ML) solution to smartly delete records from a data platform. To manually scan a store across several data records for similar records (but not exactly identical) is a cumbersome process. In addition, it is programmatically difficult to define the notion of similarity or proximity between records, and the permutations are too difficult to handle.

SUMMARY

A method for managing a data platform is disclosed. The method includes converting a plurality of data records in the data platform into embeddings. The method also includes applying a clustering algorithm to the embeddings to identify a first subset of the embeddings corresponding to a first subset of the data records and a second subset of the embeddings corresponding to a second subset of data records. The method also includes determining that the first subset of embeddings have a similarity with respect to one another that is within a first similarity threshold. The method also includes deleting one or more of the first subset of data records from the data platform in response to the similarity of the first subset of embeddings being within the first similarity threshold.

A computing system is also disclosed. The computing system includes one or more processors and a memory system. The memory system includes one or more non-transitory computer-readable media storing instructions that, when executed by at least one of the one or more processors, cause the computing system to perform operations. The operations include converting a plurality of data records in a data platform into embeddings. The operations also include reducing a dimensionality of the embeddings to two or three dimensions. The operations also include applying a clustering algorithm to the embeddings to identify a first subset of the embeddings corresponding to a first subset of the data records and a second subset of the embeddings corresponding to a second subset of data records. The operations also include plotting the embeddings on a graph. The operations also include determining that the first subset of embeddings have a similarity with respect to one another that is within a first similarity threshold by determining that a distance on the graph between two or more of the first subset of embeddings is less than a first distance threshold. The operations also include determining that the second subset of embeddings have a similarity with respect to one another that is within the first similarity threshold by determining that a distance on the graph between two or more of the second subset of embeddings is less than the first distance threshold. The operations also include determining that the first subset of embeddings and the second subset of embeddings have a similarity with respect to one another that is outside of the first similarity threshold by determining that a distance on the graph between one or more of the first subset of embeddings and one or more of the second subset of embeddings is greater than the first distance threshold. The operations also include deleting one or more of the first subset of data records from the data platform in response to the similarity of the first subset of embeddings being within the first similarity threshold and the similarity between the first subset of embeddings and the second subset of embeddings outside of the first similarity threshold.

A computer program is also disclosed. The computer program includes instructions that, when executed by a computer processor of a computing device, causes the computing device to perform operations. The operations include converting a plurality of data records in a data platform into embeddings. The data records are converted using an auto-encoder or a large language model (LLM). Each embedding includes a vector having more than three dimensions. The operations also include reducing a dimensionality of the embeddings to two or three dimensions. The operations also include applying a clustering algorithm to the embeddings to identify a first subset of the embeddings corresponding to a first subset of the data records and a second subset of the embeddings corresponding to a second subset of data records. The first subset of the data records includes duplicate data records, duplicate versions of the same data record, or a combination thereof. The clustering algorithm is applied after the dimensionality is reduced. The operations also include plotting the embeddings on a graph. The embeddings are plotted after the clustering algorithm is applied. A first axis of the graph represents a first dimension. The first dimension includes a maximum variance direction in the embeddings. A second axis on the graph represents a second dimension. The first and second axes are orthogonal to one another. The operations also include determining that the first subset of embeddings have a similarity with respect to one another that is within a first similarity threshold by determining that a distance on the graph between two or more of the first subset of embeddings is less than a first distance threshold, wherein the similarity comprises a cosine similarity. The operations also include determining that the second subset of embeddings have a similarity with respect to one another that is within the first similarity threshold by determining that a distance on the graph between two or more of the second subset of embeddings is less than the first distance threshold. The operations also include determining that the first subset of embeddings and the second subset of embeddings have a similarity with respect to one another that is outside of the first similarity threshold by determining that a distance on the graph between one or more of the first subset of embeddings and one or more of the second subset of embeddings is greater than the first distance threshold. The operations also include deleting one or more of the first subset of data records from the data platform in response to the similarity of the first subset of embeddings being within the first similarity threshold and the similarity between the first subset of embeddings and the second subset of embeddings outside of the first similarity threshold.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 5 illustrates a flowchart of a method for managing a data platform, according to an embodiment.

DETAILED DESCRIPTION

Figure 2:
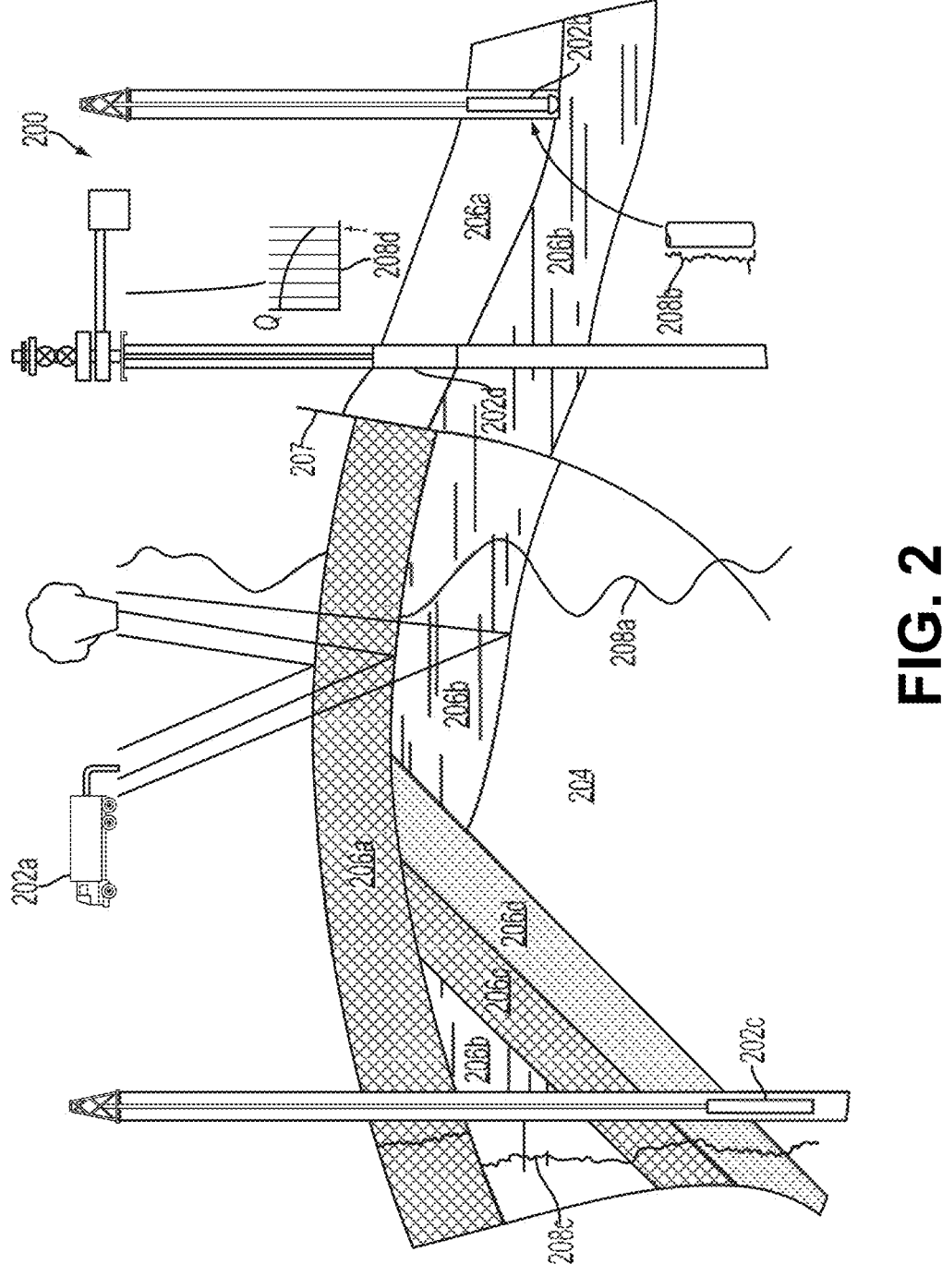

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. Although embodiments of the present method are at least partially described herein with reference to an oilfield, it will be appreciated that this is merely an illustrative example. Embodiments of the present method may be employed in any application in which visualizing, modeling, or otherwise identifying subsurface features (e.g., geological features) may be useful. Examples outside of the oilfield context include subsurface mapping for wind arrays and/or solar arrays, geothermal energy production, mining operations, offshore/deep ocean applications, etc.

FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
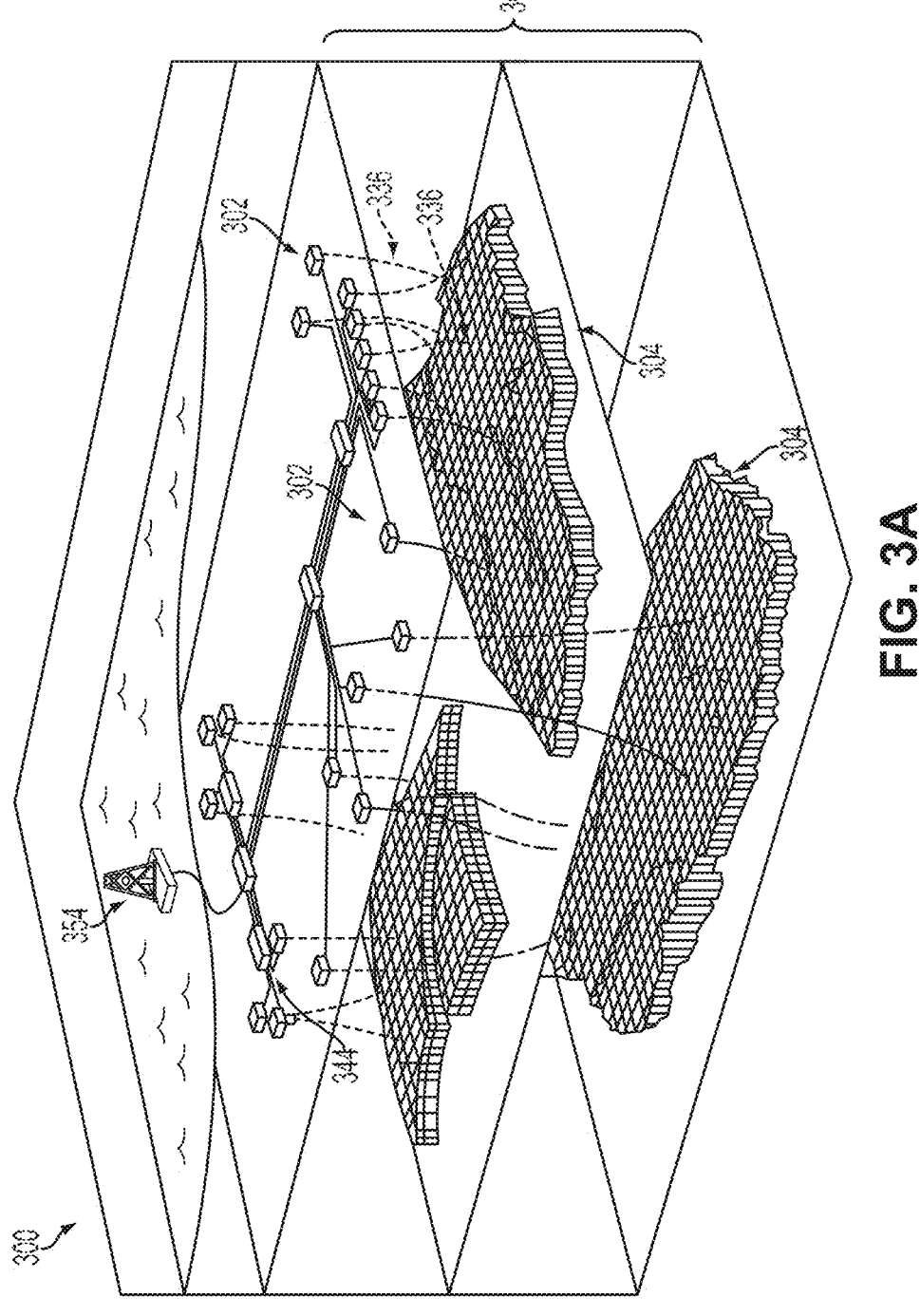

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
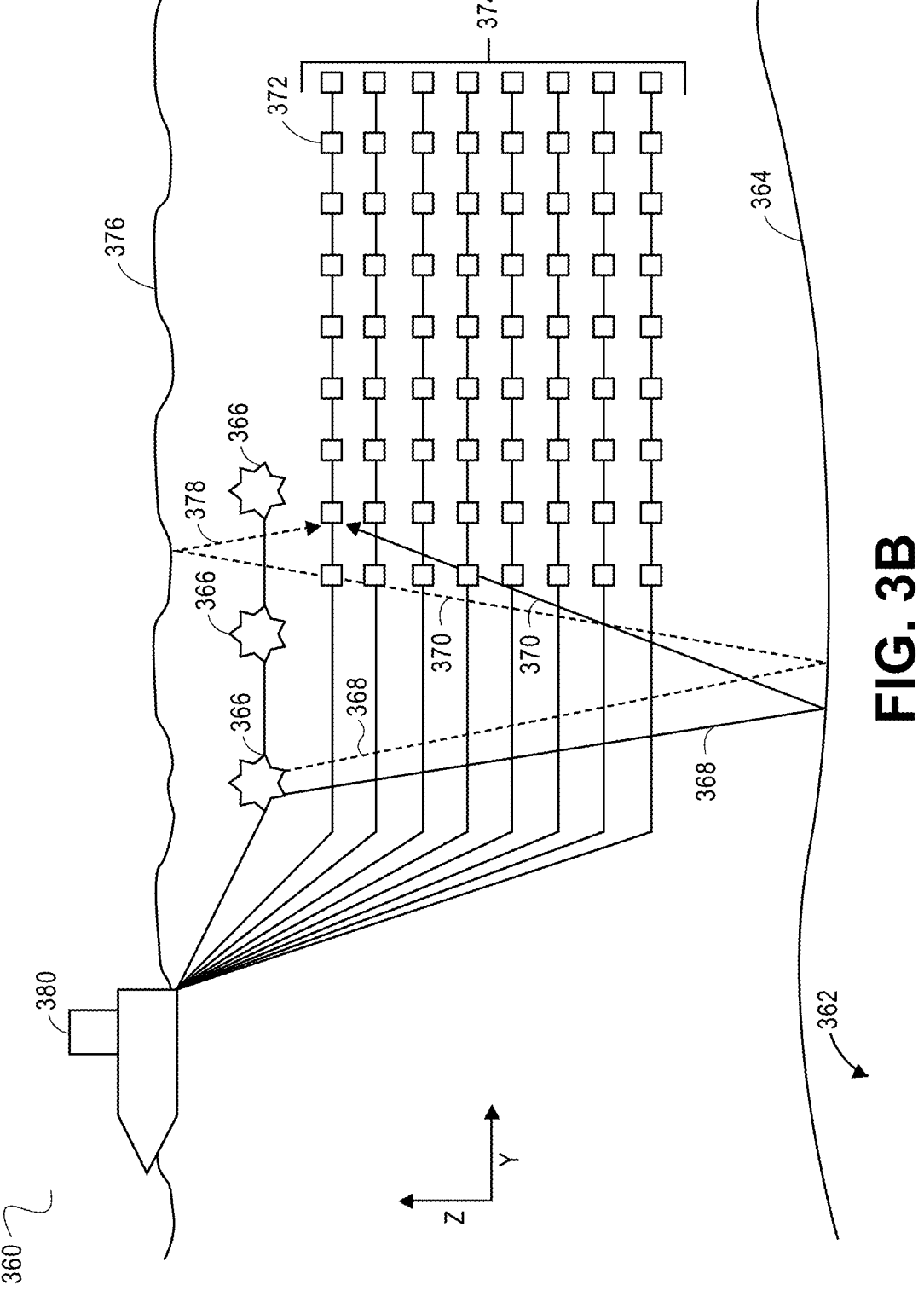

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic In the data platform, similar data records can be ingested (e.g., received and stored) from one or more sources, and/or multiple versions of the same data record can be created. This means that data related to a unique wellbore may be ingested from two or more sources. It is also possible that a data record from the same source may be ingested multiple times without any change. This may create similar (e.g., duplicate) data records pointing to the same wellbore and/or multiple versions of the same record containing similar data.

Thus, the system and method described herein may generate and use a ML algorithm that creates a unique identifier for each record and/or version in the data platform and uses the unique identifiers to identify the records and/or versions that can be marked for deletion. Such identified data records can then be deleted (e.g., after receiving consent from the data managers or data owners).

Figure 4:
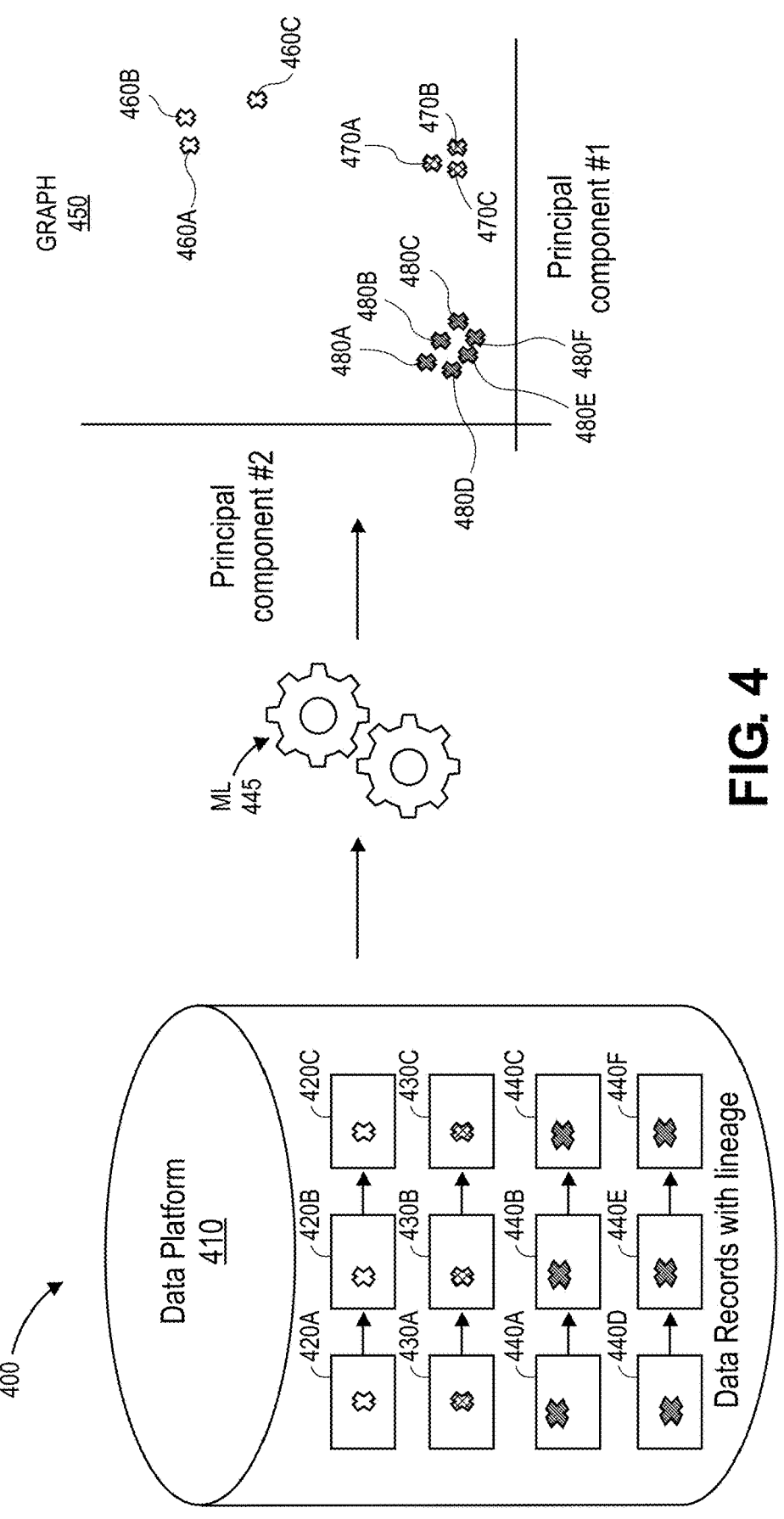
FIG. 4 illustrates a schematic view of a system for managing a data platform, according to an embodiment.

FIG. 4 illustrates a schematic view of a system 400 for managing the data platform 410, according to an embodiment. The data platform 410 may also or instead be referred to as a data blob store. The data platform 410 may receive and store a plurality of data records (and/or versions) 420A-420C, 430A-430C, 440A-440F. Over a period of time, these records may grow in number with many versions (e.g., duplications).

In one example, the data records 420A-420C, 430A-430C, 440A-440F may exist in the form of JavaScript object notation (json) and may be semi-structured with no schema enforced.

An example of a json data record is:

{ "data": { "id": "123456", "type": "well", "attributes": { "name": "Sample Well", "location": { "latitude": 35.12345, "longitude": −100.67890 }, "status": "active" } } }

35 receivers 372. In one implementation, the seismic data may be processed to generate a seismic image of the subsurface 362. Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Managing a Data Platform

The present disclosure includes a system and method for managing a data platform using machine-learning (ML). More particularly, the system and method may identify two or more data records in an (e.g., OSDU) data platform that are similar (e.g., duplicate records, duplicate versions), and the system and method may then delete one or more of the similar data records from the data platform. This may result in the data platform having less similar data (i.e., reduce redundancy), and services running on top of the data platform may thus perform more efficiently.

The data records in the data platform may be stored with different kinds. A kind is an identification for the record, and it follows a fixed pattern (e.g., authority:source:entityType: version). For example, if a data record kind is company: wks:wellbore:1.0.0, it means: the data authority (i.e., creator) is company, the data source (i.e., origin of data) is weeks, the data is of entity type wellbore, and the version of the kind is 1.0.0.

In other examples, the records may exist in the form of YAML. An example of a YAML data record that is equivalent to the json data record is:

id: "123456"
type: "well"
attributes:
name: "Sample Well"
location: latitude: 35.12345; longitude: −100.67890
status: "active"

In another example, the OSDU data records may be converted into vector embeddings, where each number in the embedding represents a specific attribute in the data record. These attributes make an individual dimension and/or contribute to the overall representation of the data record. An OSDU data record may be a json containing multiple attributes and values against them. If wellbore schema is taken as an example, it has attributes such as Well ID, Sequence Number, Drilling Reasons, Vertical Measurements, and so on. Different wellbore records have different (and/or sometimes the same) values against these attributes. An example of this is shown below for two wellbores:

Wellbore1
{
"WellID": 1234,
"SequenceNumber": 5678
"DrillingReasons": [ {"remark":"reason1"}],
" VerticalMeasurements": [
{
"VerticalMeasurementID": "Example VerticalMeasurementID",
"RigID": "namespace:master-data--Rig:SomeUniqueRigID:", -continued

```
     "EffectiveDateTime": "2020-02-13T09:13:15.55Z",
     "VerticalMeasurement": 12345.6,
   }]
}
```

```
Wellbore2
{
"WellID": 5678,
"SequenceNumber": 4529
"DrillingReasons":[ {"remark":"reason1"}],
" VerticalMeasurements": [
   {
      "VerticalMeasurementID": "Example2 VerticalMeasurementID2",
      "RigID": "namespace:master-data--Rig:SomeUniqueRigID2:",
      "EffectiveDateTime": "2020-02-14T09:13:15.35Z",
      "VerticalMeasurement": 13425.6,
   }]
}
```

Each of the values from the data records may be converted into the numbers such as: Wellbore1=[1.6, –0.4, 7.2, 19.6, 3.1, . . . , 20.2]. Then, these vectors may be used to plot the records onto a graph and find cosine distance (and/or similarity) between them to identify the duplicates and delete them. In an embodiment, each record in the OSDU data platform may also have multiple versions, and the same technique of creating embeddings may be used to identify (and/or delete) the duplicate versions of the same record.

In the example shown in FIG. 4, a first subset of the data records 420A-420C may have lineage, a second subset of the data records 430A-430C may have lineage, and a third subset of the data records 440A-440F may have lineage. As used herein, a lineage refers to an interconnected trail of modified data records, showcasing the chronological evolution, thereby depicting a transparent and comprehensive view of their journey of the data through alterations. As a result, one or more of the first subset 420A-420C may be or include similar records and/or versions, one or more of the second subset 430A-430C may be or include similar records and/or versions, and one or more of the third subset 440A-440F may be or include similar records and/or versions.

The system 400 may use a ML-based, deep-learning approach to convert the data records 420A-420C, 430A-430C, 440A-440F to (e.g., OSDU) record embeddings 460A-460C, 470A-470C, 480A-480F. More particularly, the system 400 may use an auto-encoder 445 or a large language model (LLM) to convert the data records 420A-420C, 430A-430C, 440A-440F to the embeddings 460A-460C, 470A-470C, 480A-480F. The auto-encoder 445 may use/include an encoder-decoder based architecture. The system 400 may tap the bottle-neck of the encoder 445 to generate the embeddings 460A-460C, 470A-470C, 480A-480F.

In one example, the system 400 may convert (e.g., json-style OSDU) data records 420A-420C, 430A-430C, 440A-440F to a signature/embedding. In other words, the system 400 may assign a context vector for every data record 420A-420C, 430A-430C, 440A-440F using a ML approach. The system may be used to identify which data records are similar in the data platform 410 and clean (e.g., delete) them. The technique can also be applied at sub-set level, and data records from each level can be aggregated and shown to a user.

As used herein, an embedding refers to one or more n-dimensional vectors, wherein n is greater than three. A first subset of the embeddings 460A-460C may correspond to the first subset of the data records 420A-420C, a second subset of the embeddings 470A-470C may correspond to the first subset of the data records 430A-430C, and a third subset of the embeddings 480A-480F may correspond to the third subset of the data records 440A-440F.

The embeddings 460A-460C, 470A-470C, 480A-480F may be similar (e.g., equivalent) to a signature/hash of the data records 420A-420C, 430A-430C, 440A-440F. However, unlike a conventional signature or hash, the embeddings 460A-460C, 470A-470C, 480A-480F employed herein may ensure that the cosine (or other similarity based) distance reflects the scenario "proximity" (i.e., records that appear identical in the real-world are very close to each other in the embeddings space as well).

Conventional systems do not employ deep learning-based solutions. Rather conventional systems use a deterministic approach. In other words, conventional systems do not take into account the notion of similarity. Thus, at best, conventional systems can delete identical records.

Deletion, and hence cleaning, of the data platform 410 on periodic basis may free up memory. In a cloud-based setting, this translates into saving revenue. The performance of the services running on such clean data platform may also be higher (e.g., faster), because the data that the services operate upon is cleaner and has fewer similar records. Users may be relieved from the hassle of deleting the similar data due to redundant (e.g., duplicate) records and/or versions, and they may not have to worry about the costs associated with extra records and/or versions. In addition, the users will not have to do the cumbersome task of maintaining spurious records and/or versions. Rather, these spurious records and/or versions will be deleted automatically. Clients can build report on top of the data platform 410 with or without smart deletion of the data records. The reduced cost for storage can then be calculated and/or forecasted.

FIG. 5 illustrates a flowchart of a method 500 for managing the data platform 410, according to an embodiment. More particularly, the method 500 may be used to identify and delete one or more similar data records 420A-420C, 430A-430C, 440A-440F in the data platform 410 to free space and increase processing speed. An illustrative order of the method 500 is provided below; however, one or more portions of the method 500 may be performed in a different order, simultaneously, repeated, or omitted.

The method 500 may include converting a plurality of data records 420A-420C, 430A-430C, 440A-440F in a data platform 410 into embeddings 460A-460C, 470A-470C, 480A-480F, as at 510. More particularly, each data record 420A-420C, 430A-430C, 440A-440F may be converted into a respective embedding 460A-460C, 470A-470C, 480A-480F. For example, the embedding 460A may correspond to the data record 420A, the embeddings 460B may correspond to the data record 420B, and so on. The data records 420A-420C, 430A-430C, 440A-440F may be converted using the auto-encoder 445 and/or a large language model (LLM). Each embedding 460A-460C, 470A-470C, 480A-480F may include a vector having more than three dimensions.

The method 500 may also include reducing a dimensionality of the embeddings 460A-460C, 470A-470C, 480A-480F, as at 520. In an example, the dimensionality may be reduced to two or three dimensions.

The method 500 may also include applying a clustering algorithm to the embeddings 460A-460C, 470A-470C, 480A-480F, as at 530. The clustering algorithm may be applied after the dimensionality is reduced. The clustering algorithm may be used to identify the embeddings (e.g., embeddings 460A-460C) corresponding to the first subset of the data records 420A-420C, the embeddings 470A-470C corresponding to the second set of data records 430A-430C, the embeddings 480A-480F corresponding to the third set of data records 440A-440F, and so forth. One or more of the first subset of the data records 420A-420C may be similar (e.g., duplicate records, duplicate versions). One or more of the second subset of the data records 430A-430C may be similar. One or more of the third subset of the data records 440A-440F may be similar.

Figure 6:
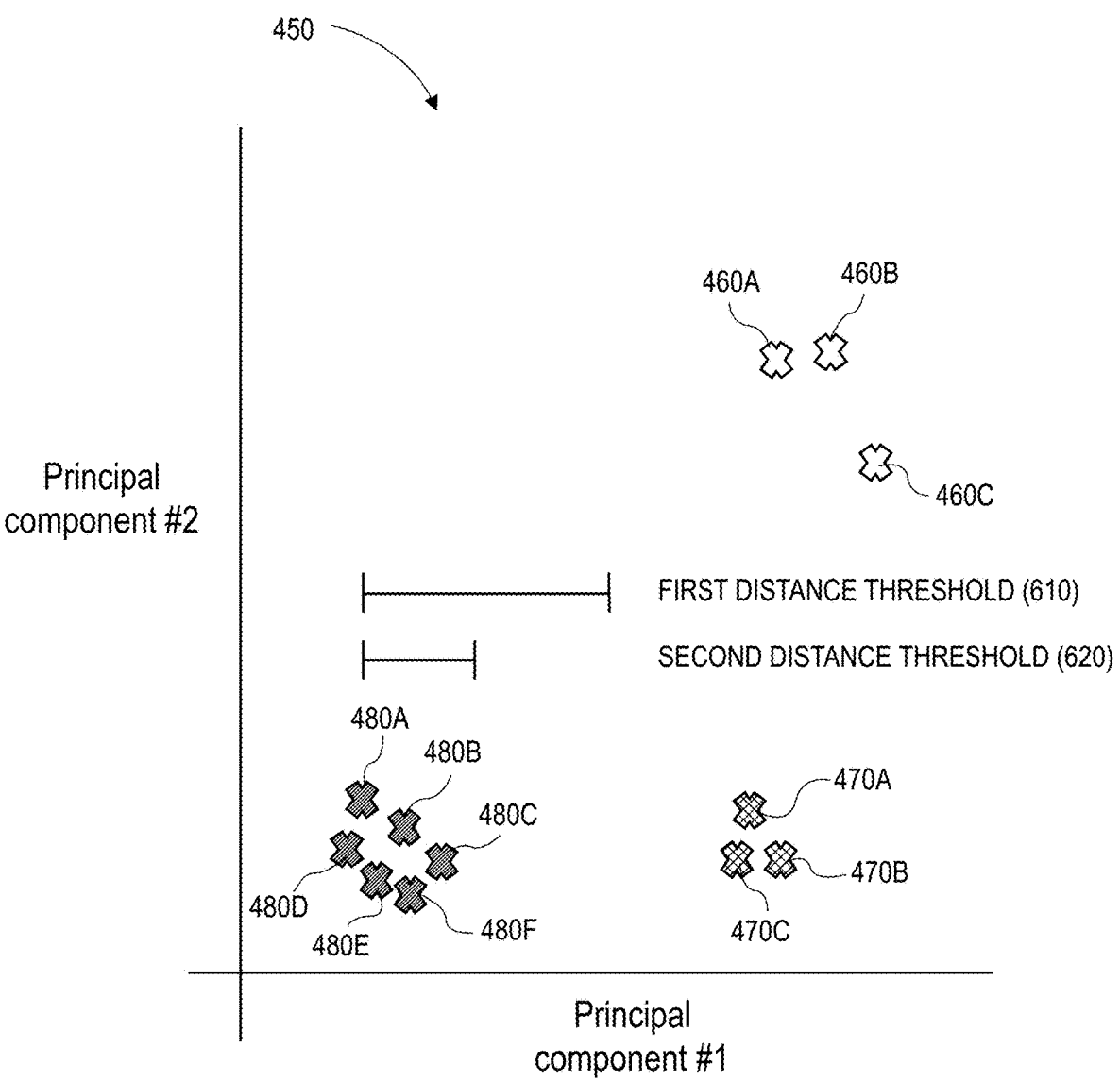
FIG. 6 illustrates an enlarged view of a graph from FIG. 4.

The method 500 may also include plotting the embeddings 460A-460C, 470A-470C, 480A-480F on a graph 450, as at 540. The graph 450 may be seen in FIG. 4, and an enlarged view of the graph 450 may be seen in FIG. 6. The embeddings 460A-460C, 470A-470C, 480A-480F may be plotted after the clustering algorithm is applied. A first axis (e.g., X-axis) of the graph 450 represents a first dimension (e.g., of the two or three dimensions). The first dimension may represent a maximum variance direction in the embeddings 460A-460C, 470A-470C, 480A-480F. A second axis on the graph 450 represents a second dimension (e.g., of the two or three dimensions). Although not shown, a third axis of the graph 450 may represent a third dimension (e.g., of the two or three dimensions). The axes may be orthogonal to one another.

The method 500 may also include determining that two or more of the first subset of embeddings 460A-460C have a similarity with respect to one another that is within a first similarity threshold, as at 550. The similarity may be or include a cosine similarity. In an example, this may include determining that a distance on the graph 450 between two or more of the embeddings (e.g., embedding 460A and embedding 460B) in the first subset of embeddings 460A-460C is less than a first distance threshold 610. This may include also or instead include determining that a distance on the graph 450 between two or more of the embeddings (e.g., embedding 460B and embedding 460C) in the first subset of embeddings 460A-460C is less than the first distance threshold 610. This may include also or instead include determining that a distance on the graph 450 between two or more of the embeddings (e.g., embedding 460C and embedding 460A) in the first subset of embeddings 460A-460C is less than the first distance threshold 610.

The method 500 may also include determining that two or more of the second subset of embeddings 470A-470C have a similarity with respect to one another that is within the first similarity threshold, as at 560. In an example, this may include determining that a distance on the graph 450 between two or more of the embeddings (e.g., embedding 470A and embedding 470B) in the second subset of embeddings 470A-470C is less than the first distance threshold 610. This may also or instead include determining that a distance on the graph 450 between two or more of the embeddings (e.g., embedding 470B and embedding 470C) in the second subset of embeddings 470A-470C is less than the first distance threshold 610. This may also or instead include determining that a distance on the graph 450 between two or more of the embeddings (e.g., embedding 470C and embedding 470A) in the second subset of embeddings 470A-470C is less than the first distance threshold 610.

The method 500 may also include determining that one or more of the first subset of embeddings 460A-460C and one or more of the second subset of embeddings 470A-470C have a similarity with respect to one another that is outside of the first similarity threshold, as at 570. In other words, one or more of the first subset of embeddings 460A-460C is dis-similar to one or more of the second subset of embeddings 470A-470C. This may include determining that a distance on the graph 450 between one or more of the first subset of embeddings (e.g., embedding 460A) and one or more of the second subset of embeddings (e.g., 470A) is greater than the first distance threshold 610. This may also or instead include determining that a distance on the graph 450 between one or more of the first subset of embeddings (e.g., embedding 460A) and one or more of the second subset of embeddings (e.g., 470B) is greater than the first distance threshold 610. This may also or instead include determining that a distance on the graph 450 between one or more of the first subset of embeddings (e.g., embedding 460B) and one or more of the second subset of embeddings (e.g., 470B) is greater than the first distance threshold 610.

The method 500 may also include deleting one or more of the first subset of data records 420A-420C from the data platform 410, as at 580. The deletion may be in response to the similarity of the first subset of embeddings 460A-460C being within the first similarity threshold 610. The deletion may also or instead be in response to the similarity between the first subset of embeddings 460A-460C and the second subset of embeddings 470A-470C being outside the first similarity threshold 610. The deletion may free up space in the data platform 410, which enables new data records to be added. The deletion may also allow the system 400 and/or the data platform 410 to operate faster and/or more efficiently.

In one embodiment, deleting the one or more of the first subset of data records 420A-420C may include deleting one or more intermediate data records (e.g., data record 420B corresponding to embedding 460B) from the data platform 410 while retaining a first data record (e.g., data record 420A corresponding to embedding 460A) and a last data record (e.g., data record 420C corresponding to embedding 460C). The intermediate data record(s) may have been uploaded into the data platform 410 and/or modified in the data platform 410 between a time when the first data record 420A was uploaded/modified and a time when the last data record 420C was uploaded/modified.

In another embodiment, deleting the one or more of the first subset of data records 420A-420C may include determining that two or more of the first subset of embeddings 460A-460C have a similarity with respect to one another that is within a second similarity threshold. The second similarity threshold may be less than the first similarity threshold. This may include determining that a distance on the graph 450 between two or more of the embeddings (e.g., embeddings 460A, 460B) in the first subset of embeddings 460A-460C is less than a second distance threshold 620. The second distance threshold 620 may be less than the first distance threshold 610. In response, the data record (corresponding to embedding 460A) or data record (corresponding to embedding 460B), but not both, may be deleted from the data platform 410. In this particular example, the distance on the graph 450 between the embeddings 460A and 460C (or 460B and 460C) is greater than the second distance threshold 620. Thus, the data record 420C (corresponding to embedding 460C) may be retained (e.g., not deleted).

The method 500 may also include performing a wellsite action. The wellsite action may be performed in response to the determination at 550, the determination at 560, the determination at 570, the deletion at 580, or a combination thereof. The wellsite action may be or include generating and/or transmitting a signal (e.g., using a computing system) that instructs or causes a physical action to occur at a wellsite. The wellsite action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, or the like.

Figure 7:
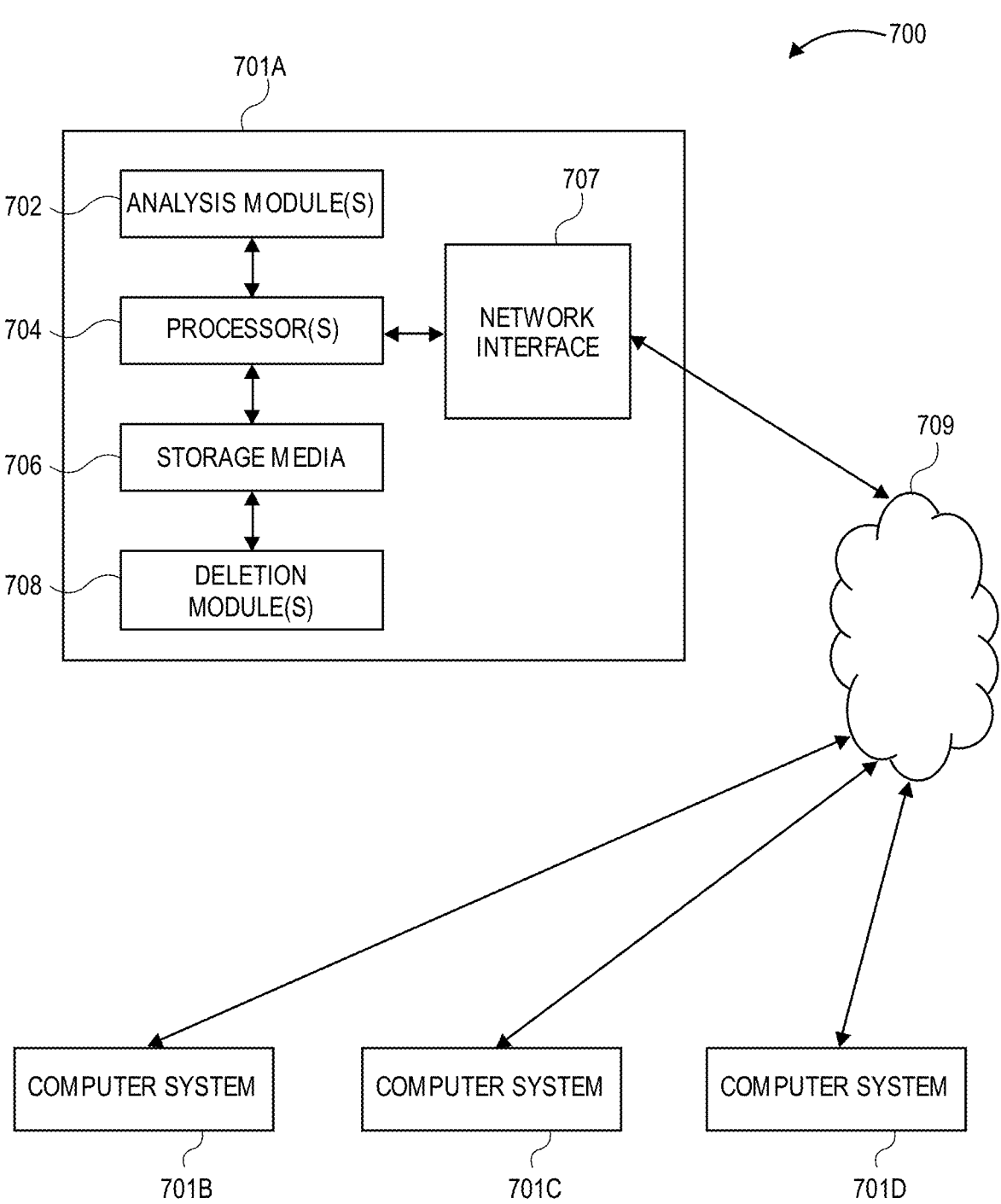
FIG. 7 illustrates a computing system for performing at least a portion of the method(s) disclosed herein, according to an embodiment.

In some embodiments, any of the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more data record deletion module(s) 708 that may perform at least a portion of one or more of the method(s) described above. It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subterranean three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for managing a data platform, the method comprising:

converting a plurality of non-identical semi-structured data records in the data platform into embeddings;

reducing a dimensionality of the embeddings to two or three dimensions;

applying a clustering algorithm to the embeddings to identify:

a first subset of the embeddings corresponding to a first subset of data records; and a second subset of the embeddings corresponding to a second subset of data records;

plotting the embeddings on a graph;

determining that the first subset of the embeddings have a similarity with respect to one another that is within a first similarity threshold by determining that a distance on the graph between two or more of the first subset of the embeddings is less than a first distance threshold, the first subset comprising at least three data records;

determining that the second subset of the embeddings have a similarity with respect to one another that is within the first similarity threshold by determining that a distance on the graph between two or more of the second subset of the embeddings is less than the first distance threshold;

determining that the first subset of the embeddings and the second subset of the embeddings have a similarity with respect to one another that is outside of the first similarity threshold by determining that a distance on the graph between one or more of the first subset of the embeddings and one or more of the second subset of the embeddings is greater than the first distance threshold; and deleting at least one intermediate data record of the first subset of data records from the data platform in response to the similarity of the first subset of the embeddings being within the first similarity threshold while retaining an earlier data record and a later data record of the first subset of data records having the similarity, wherein the at least one intermediate data record was uploaded into the data platform or modified in the data platform between a time when the earlier data record was uploaded into the data platform or modified in the data platform and a time when the later data record was uploaded into the data platform or modified in the data platform, wherein the earlier data record is first uploaded or modified among the earlier data record, the at least one intermediate data record, and the later data record, wherein the at least one intermediate data record is second uploaded or modified among the earlier data record, the at least one intermediate data record, and the later data record, and wherein the later data record is third uploaded or modified among the earlier data record, the at least one intermediate data record, and the later data record.

2. The method of claim 1, further comprising reducing the dimensionality of the embeddings from greater than three dimensions down to two or three dimensions.

3. The method of claim 1, wherein the similarity comprises a cosine similarity.

4. The method of claim 1, further comprising determining that the first subset of the embeddings and the second subset of the embeddings have a similarity with respect to one another that is outside of the first similarity threshold by determining that a distance on the graph between one or more of the first subset of the embeddings and one or more of the second subset of the embeddings is greater than the first distance threshold.

5. The method of claim 1, wherein:

the deleting the at least one intermediate data record is further in response to determining that two of the first subset of the embeddings have a similarity with respect to one another that is within a second similarity threshold; and the second similarity threshold is less than the first similarity threshold.

6. The method of claim 5, wherein at least one, but not both, of the two of the first subset of the embeddings having the similarity within the second similarity threshold is deleted.

7. A computing system, comprising:

one or more processors; and a memory system comprising one or more non-transitory computer-readable media storing instructions that, when executed by at least one of the one or more processors, cause the computing system to perform operations, the operations comprising:

converting a plurality of non-identical semi-structured data records in a data platform into embeddings;

reducing a dimensionality of the embeddings to two or three dimensions;

applying a clustering algorithm to the embeddings to identify:

a first subset of the embeddings corresponding to a first subset of data records; and a second subset of the embeddings corresponding to a second subset of data records;

plotting the embeddings on a graph;

determining that the first subset of the embeddings have a similarity with respect to one another that is within a first similarity threshold by determining that a distance on the graph between two or more of the first subset of the embeddings is less than a first distance threshold;

determining that the second subset of the embeddings have a similarity with respect to one another that is within the first similarity threshold by determining that a distance on the graph between two or more of the second subset of the embeddings is less than the first distance threshold;

determining that the first subset of the embeddings and the second subset of the embeddings have a similarity with respect to one another that is outside of the first similarity threshold by determining that a distance on the graph between one or more of the first subset of the embeddings and one or more of the second subset of the embeddings is greater than the first distance threshold; and deleting at least one intermediate data record of the first subset of data records from the data platform in response to the similarity of the first subset of the embeddings being within the first similarity threshold while retaining an earlier data record and a later data record of the first subset of data records having the similarity, wherein the at least one intermediate data record was uploaded into the data platform or modified in the data platform between a time when the earlier data record was uploaded into the data platform or modified in the data platform and a time when the later data record was uploaded into the data platform or modified in the data platform, wherein the earlier data record is first uploaded or modified uploaded or modified among the earlier data record, the at least one intermediate data record, and the later data record, wherein the at least one intermediate data record is second uploaded or modified among the earlier data record, the at least one intermediate data record, and the later data record, and wherein the later data record is third uploaded or modified among the earlier data record, the at least one intermediate data record, and the later data record.

8. The computing system of claim 7, wherein:

the data records are converted using an auto-encoder or a large language model (LLM); and each embedding comprises a vector having more than three dimensions.

9. The computing system of claim 7, wherein the first subset of the data records comprises duplicate data records, duplicate versions of a same data record, or a combination thereof.

10. The computing system of claim 7, wherein:

the embeddings are plotted after the clustering algorithm is applied;

a first axis of the graph represents a first dimension;

the first dimension comprises a maximum variance direction in the embeddings;

a second axis on the graph represents a second dimension; and the first axis and the second axis are orthogonal to one another.

11. The computing system of claim 7, wherein the deleting the at least one intermediate data record from the data platform increases an amount of available memory on the data platform and increases a speed at which the data platform is searched.

12. A computer program comprising instructions that, when executed by a computer processor of a computing device, causes the computing device to perform operations, the operations comprising:

converting a plurality of non-identical semi-structured data records in a data platform into embeddings, the data records being converted using an auto-encoder or a large language model (LLM), each embedding comprising a vector having more than three dimensions;

reducing a dimensionality of the embeddings to two or three dimensions;

applying a clustering algorithm to the embeddings to identify:

a first subset of the embeddings corresponding to a first subset of data records; and a second subset of the embeddings corresponding to a second subset of data records, wherein the clustering algorithm is applied after the dimensionality is reduced;

plotting the embeddings on a graph, the embeddings being plotted after the clustering algorithm is applied, a first axis of the graph representing a first dimension, the first dimension comprising a maximum variance direction in the embeddings, a second axis on the graph representing a second dimension, the first axis and the second axis being orthogonal to one another;

determining that the first subset of the embeddings have a similarity with respect to one another that is within a first similarity threshold by determining that a distance on the graph between two or more of the first subset of the embeddings is less than a first distance threshold, the similarity comprising a cosine similarity;

determining that the second subset of the embeddings have a similarity with respect to one another that is within the first similarity threshold by determining that a distance on the graph between two or more of the second subset of the embeddings is less than the first distance threshold;

determining that the first subset of the embeddings and the second subset of the embeddings have a similarity with respect to one another that is outside of the first similarity threshold by determining that a distance on the graph between one or more of the first subset of the embeddings and one or more of the second subset of the embeddings is greater than the first distance threshold; and deleting at least one intermediate data record of the first subset of data records from the data platform in response to the similarity of the first subset of the embeddings being within the first similarity threshold while retaining an earlier data record and a later data record of the first subset of data records having the similarity, wherein the at least one intermediate data record was uploaded into the data platform or modified in the data platform between a time when the earlier data record was uploaded into the data platform or modified in the data platform and a time when the later data record was uploaded into the data platform or modified in the data platform, wherein the earlier data record is first uploaded or modified among the earlier data record, the at least one intermediate data record, and the later data record, wherein the at least one intermediate data record is second uploaded or modified among the earlier data record, the at least one intermediate data record, and the later data record, and wherein the later data record is third uploaded or modified among the earlier data record, the at least one intermediate data record, and the later data record.

13. The computer program of claim 12, wherein the deleting the at least one intermediate data record comprises determining that two or more of the first subset of the embeddings have a similarity with respect to one another that is within a second similarity threshold by determining that a distance on the graph between two or more of the embeddings in the first subset of the embeddings is less than a second distance threshold.

14. The computer program of claim 13, wherein:

the second similarity threshold is less than the first similarity threshold; and the second distance threshold is less than the first distance threshold.

15. The computer program of claim 12, further comprising updating the graph to remove one or more of the first subset of the embeddings that correspond to the one or more of the first subset of data records that are deleted from the data platform.

* * * * *